(12) United States Patent
Williams

(10) Patent No.: US 6,767,677 B2
(45) Date of Patent: Jul. 27, 2004

(54) DISPLAY ELEMENT WITH A BACKPRINT COMPRISING A SQUARINE DYE

(75) Inventor: Kevin W. Williams, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/300,343

(22) Filed: Nov. 20, 2002

(65) Prior Publication Data

US 2004/0101768 A1 May 27, 2004

(51) Int. Cl.$^7$ ............... G03C 11/02; G03C 11/08; G01D 11/00
(52) U.S. Cl. ............... 430/12; 430/22; 430/496; 430/536; 430/944; 347/100; 396/210; 396/310; 396/315
(58) Field of Search ............... 430/22, 12, 536, 430/496, 944; 396/210, 310, 315; 347/100

(56) References Cited

U.S. PATENT DOCUMENTS

| | | |
|---|---|---|
| 4,237,194 A | 12/1980 | Upson et al. |
| 4,259,313 A | 3/1981 | Frank et al. |
| 4,304,769 A | 12/1981 | Chen |
| 4,401,787 A | 8/1983 | Chen |
| 4,713,314 A | 12/1987 | Namba et al. |
| 4,753,923 A | 6/1988 | Byers et al. |
| 5,326,692 A | 7/1994 | Brinkley et al. |
| 5,547,728 A | 8/1996 | Cunningham et al. |
| 5,594,047 A | 1/1997 | Nielsen et al. |
| 5,852,074 A | 12/1998 | Tsutsumi et al. |
| 5,853,969 A * | 12/1998 | Harada et al. ............ 430/944 |
| 5,919,850 A | 7/1999 | Wang et al. |
| 6,210,871 B1 * | 4/2001 | Ishii et al. ............ 430/584 |
| 6,255,043 B1 * | 7/2001 | Haydock et al. ............ 430/536 |
| 6,361,916 B1 | 3/2002 | Chen et al. |

FOREIGN PATENT DOCUMENTS

EP  0 483 387 B1  8/1995

OTHER PUBLICATIONS

U.S. application Ser. No. 10/300,171 of Kevin W. Williams et al, "Stable IR Dye Compositions For Invisible Marking".
U.S. application Ser. No. 10/300,542 of Kevin W. Williams et al, "Display Element With a Backprint".
U.S. application Ser. No. 10/300618 of Kevin W. Williams et al, "Photographic Display Elements Comprising Stable IR Dye Compositions For Invisible Marking".

* cited by examiner

Primary Examiner—Richard L. Schilling
(74) Attorney, Agent, or Firm—Sarah Meeks Roberts

(57) ABSTRACT

This invention relates to a silver halide photographic display element comprising a support, a front side which has at least one silver halide emulsion layer, and a back side, said front and back sides being on opposite sides of the support; wherein said photographic element further comprises printed on the back side a printing ink composition comprising coalesced hydrophobic polymer particles having associated therewith a squarine infrared absorbing dye represented by formula I:

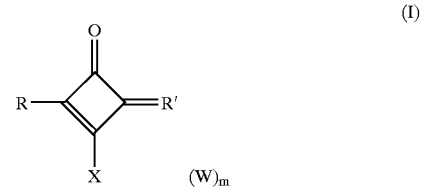

(I)

wherein:

R and R' independently represents an aromatic or a heteroaromatic group such that the resulting dye has an absorption max greater than 800 nm;

X represents an oxygen or nitrogen atom, or a group containing an oxygen or a nitrogen atom as a heteroatom, wherein the group must be attached through the heteroatom;

W is a monovalent counter anion to balance the charge on the dye and m is 0 or 1.

7 Claims, No Drawings

DISPLAY ELEMENT WITH A BACKPRINT COMPRISING A SQUARINE DYE

FIELD OF THE INVENTION

The present invention relates to silver halide display elements having printed on the back side a printing ink composition comprising coalesced hydrophobic polymer particles having associated therewith a squarine infrared absorbing dye. It further comprises methods for making said display element.

BACKGROUND OF THE INVENTION

Logos are often printed on objects using dyes for cosmetic purposes or as authentification needs. Marks may be a corporate name or other identifying trademarked symbols. For cosmetic reasons the visible color is chosen with great scrutiny. In fact, the actual color may be the most important element of authentification. A more sophisticated means of making a mark useful for authentification is to make the component that is unique invisible to the naked eye. One such way is to use a dye of very low concentration or even more ideally one which absorbs outside the visible region, preferably in the infrared. In fact, many applications in the art describe the use of infrared dyes for security marking purposes. However, dyes that absorb in the infrared region are generally not stable in solution or in air and are particularly susceptible to light fade. This degradation renders them useless for most applications without the presence of a stabilizer. When a dye is used for security or authentification elements, the degradation of this dye eventually results in the inability to recognize the authentification element.

Additionally, there are several reasons why one might want to apply an infrared dye containing composition to the surface of an element carrying a photographic image. For example, a protective overcoat including the infrared absorbing dye can be applied as a final overcoat to assist in the stabilization of the underlying dye stability in an inkjet print. In another embodiment, information can be encoded using an infrared absorbing ink that is invisible to the naked eye over the surface of a photographic print. The information that is in coated on the surface of the print can be, for example, sound information and the like, for example, in U.S. application Ser. No. 09/223,859 filed Sep. 13, 2000. The sound information can be encoded, for example, using bar coding, or some other form of the digital encoding. The surface of the print can then be "played" using a suitable infrared dye detecting apparatus. In another embodiment a surface may need to be marked for simple detection of such mark by silicon based detectors. Such marks can be used to identify an element for further downstream processing events. The same types of stabilization issues exist for the use of infrared dye compositions on photographic elements.

Dye stabilization is well known in the art. Mitsubishi Kasai (EP 0 483 387 A1) and TDK Corp. (U.S. Pat. No. 4,713,314) describes the use of cyanine dyes combined with metal stabilizers. Nickel formazan dyes have been described by Kodak as stabilizers for infrared dyes (U.S. Pat. No. 5,547,728). Additionally, metal dithiolene dyes alone have been disclosed as useful stable dyes for bar coding applications by Kodak (U.S. Pat. No. 4,753,923).

A further limitation on the use of infrared dyes has been solubility issues. One solution to this problem has been the use of loaded latex particles. Loaded latex particles are known for use in a variety of photographic and non-photographic applications. For example, in U.S. Pat. No. 4,237,194 there is described an antistatic composition that uses a polyaniline salt loaded on a polymer latex particle. Coating of the latex composition, followed by drying and core lessons of the latex, produce a suitable antistatic layer. It is also known to load latex particles with fluorescent labels in immunology research. (See, for example, U.S. Pat. No. 4,259,313). Also, multiple fluorescent dyes can be loaded onto the sarne latex particle to achieve useful results (see, for example, U.S. Pat. Nos. 5,326,692 and 5,919,850). U.S. Pat. No. 5,852,074 discloses the use of latex compositions for inkjet inks. U.S. Pat. Nos. 4,401,787; 4,304,769; and 5,594,047 describe various methods of manufacturing loaded latex compositions and discuss the use of such compositions in photographic elements.

U.S. Pat. No. 6,361,916 B1 describes making latex dispersions of infrared dyes. The latex loading allows dispersion of otherwise aqueous insoluble dyes into aqueous solutions. It also allows more efficient dye stabilization due to increased proximity of dye and a co-loaded stabilizer. It further describes photographic elements where those infrared dispersions were added as an additional layer to the photographic surface of the element.

In the processing of photographic media in, for example, a printer or scanner, knowledge of the type of media being processed is beneficial to optimize the use of the media and to assure that the processing that is performed on the media is consistent with the specific type of media in the processor. There are many methods of detecting media type. Some of these methods require additional manufacturing steps, such as applying a special mark, a bar code, or a notch on the media. This adds to the cost of manufacturing the media and also creates unsightly markings on the media. Further, as noted above, many marking methods utilize dyes which have stability or solubility problems. There is still needed an improved method of marking media for detecting the type of media that is to be utilized in an imaging apparatus such as a printer or a scanner.

SUMMARY OF THE INVENTION

This invention provides a silver halide photographic display element comprising a support, a front side which has at least one silver halide emulsion layer, and a back side, said front and back sides being on opposite sides of the support; wherein said photographic element further comprises printed on the back side a printing ink composition comprising coalesced hydrophobic polymer particles having associated therewith a squarine infrared absorbing dye represented by formula I:

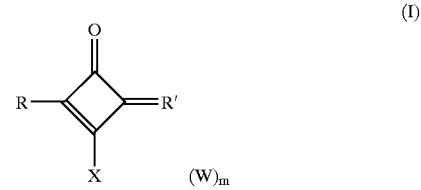

wherein:
  R and R' independently represents an aromatic or a heteroaromatic group such that the resulting dye has an absorption max greater than 800 nm;
  X represents an oxygen or nitrogen atom, or a group containing an oxygen or a nitrogen atom as a heteroatom, wherein the group must be attached through the heteroatom;

W is a monovalent counter anion to balance the charge on the dye and m is 0 or 1. It further provides a process for producing a display element having printed on the back side a printing ink composition comprising coalesced hydrophobic polymer particles having associated therewith a squarine infrared absorbing dye represented by formula (I), comprising the steps of:

(1) printing a latex composition having water as a continuous phase and, as the dispersed phase, hydrophobic polymer particles having associated therewith the squarine infrared dye, in a digital pattern to said surface of said display element; and (2) coalescing said latex.

The latex polymer composition used in this invention provides a number of advantages over the prior art. One advantage is the ability to provide a printing ink composition with high infrared sensitivity. When the ink composition has a colorant highly absorbing in the visible region of the electromagnetic spectrum and a dye that is an infrared absorbing dye, the display elements of this invention also have high sensitivity to optical sensors. The high sensitivity in both the infrared and colored spectrum allows for accurate detection by sensors in the processor, allowing the display elements of the invention to provide "instructions" to the processor. The printing ink composition also increases the stability of the infrared dye. The squarine infrared dye latex composition is a particularly stable dye composition.

DETAILED DESCRIPTION OF THE INVENTION

The inventors herein have found that infrared absorbing dyes can be loaded on latex polymer particles and then dispersed to form printing inks or added to preformed colored printing inks. The infrared dye on the latex, therefore, allows marking of a photographic element with a dye that would otherwise not be useful in aqueous based inks. According to the present invention, the infrared dye must be "associated with" the hydrophobic latex particles in the latex composition. By "associated with" it is meant that the infrared dye is attached to or located within the polymer particle—that is, the dye is not merely mixed or dispersed with the latex dispersion as is known in the art, but must become a part of the individual polymer particles—that is, substantially all of the infrared dye that is in the coating composition must be adsorbed, absorbed, or otherwise become an integral part of the polymer particles. Reference is made to the following U.S. Pat. Nos. 4,199,363; 4,304,769; 4,401,787; 5,594,047 and 6,361,916 that are incorporated herein by reference. Stabilizers may be utilized with the hydrophobic polymer particles but are not required. In one embodiment of the invention the coalesced hydrophobic polymer particles do not contain a stabilizer.

Particularly useful with this invention is an infrared light-absorbing dye that is a squarine dye having the following formula:

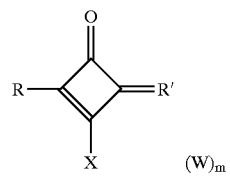

wherein:

R and R' independently represents an aromatic or a heteroaromatic group such that the resulting dye has an absorption max greater than 800 nm. Some useful R and R' groups include anilino, naphthalino, benthiazolium, naphthiazolium, benz (c,d) indolium, benz (e) indolium, benz (g) indolium, pyrrylium, thiapyrrylium, selenopyrrylium, and telluropyrrlium. X represents an oxygen or nitrogen atom or a group containing an oxygen or a nitrogen atom as the heteroatom. The X group must be attached through the heteroatom. Suitable groups include OR" and NHR" wherein R" independently represents hydrogen or an alkyl group having 1 to 12 carbon atoms, a cycloalkyl group having 5 to 10 carbon atoms in the carbocyclic ring, an aryl group having 6 to 10 carbon atoms in the carbocyclic ring, or a heterocyclic or polymeric backbone group. R" may also form a ring or ring system with the nitrogen atom. When X has a negative charge such as O−, the charge must be counterbalanced with a + charged group within the R or R' substituents, alternatively when X is not charged, such as when it is OH, OR", or NHR" then the resulting dye molecule has a positive charge that must be counterbalanced with an anion such as a chloride or sulfate group of said W. Preferably X is an oxygen. W is a monovalent counteranion to balance the charge on the dye when necessary m is 0 or 1.

In a preferred embodiment of the invention, the light-absorbing dye comprising a squaraine dye described in this invention has R or R', and preferably both, being benz (c,d) indolium, Suitably, the dye has the following formula:

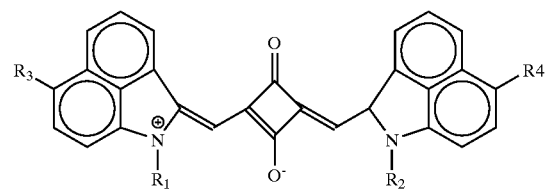

wherein $R_1$, $R_2$, $R_3$, and R4 are independently a hydrogen or a halide atom, an alkylammonium (e.g., $N(CH_3)_2$, hydroxy or alcoxy group; an alkyl group having 1 to 20 carbon atoms, a cycloalkyl group having 5 to 10 carbon atoms in the carbocyclic ring, an aryl group having 6 to 10 carbon atoms in the carbocyclic ring, or a heterocyclic group having 3 to 7 atoms in the ring. $R_3$ and $R_4$ may be independently joined with the benzo groups to form a 5- to 7-membered ring or heterocyclic ring group.

Examples of the infrared light-absorbing dyes within the above formula include the following:

| Dye | $R_1$ | $R_2$ | $R_3$ | $R_4$ |
|---|---|---|---|---|
| 1 | Me | Me | H | H |
| 2 | Me | Me | Br | Br |
| 3 | Me | Phenyl | $N(CH_3)_2$ | Cl |
| 4 | $(CH_2)_{12}CH_3$ | $(CH_2)_{12}CH_3$ | H | H |
| 5 | $C_{12}H_{25}$ | C12H25 | Br | Br |
| 6 | $CH_2CH(CH_3)_2$ | $CH_2CH(CH_3)_2$ | H | H |
| 7 | $CH_2CH(CH_3)_2$ | $C_{12}H_{25}$ | $N(Ph)_2$ | $N(Ph)_2$ |
| 8 | $C_2H_4OH$ | $C_2H_4OH$ | H | H |

Unless otherwise specifically stated, use of the term "group", "substituted" or "substituent" means any group or atom other than hydrogen. Additionally, when the term "group" is used, it means that when a substituent group contains a substitutable hydrogen, it is also intended to encompass not only the substituent's unsubstituted form, but also its form further substituted with any substituent group or groups as herein mentioned, so long as the substituent does not destroy properties necessary for photographic utility. Suitably, a substituent group may be halogen or may be bonded to the remainder of the molecule by an atom of carbon, silicon, oxygen, nitrogen, phosphorous, or sulfur. The substituent may be for example, halogen, such as chlorine, bromine or fluorine; nitro; hydroxyl; cyano; carboxyl; or groups which may be further substituted, such as alkyl, including straight- or branched-chain or cyclic alkyl, such as methyl, tryflouromethyl, ethyl, t-butyl, 3-(2,4-di-t-pentylphenoxy) propyl, cyclohexyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy, aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonyl amino, benzyloxycarbonylamino, hexadecyloxycarbonylamino, 2,4-di-t-butylphenoxycarbonylamino, phenylcarbonylamino, 2,5-(di-t-pentylphenyl)carbonyl amino, p-dodecyl-phenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropylsulfamoylamino, and hexadecylsulfonamido; sulfarnoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecyisulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsiulfinyl, phenylsulfinyl, 4-nonylphenylsulfinyl, and p-tolylsulfinyl; thio, such as ethylthio, octylthio, benzylthio, tetradecylthio, 2-(2,4di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy, amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutyiphosphate; phosphite, such as diethyl and dihexylphosphite; a heterocyclic group, a heterocyclic oxy group, or a heterocyclic thio group, each of which may be substituted and which contain a 3- to 7-membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired photographic properties for a specific application and can include, for example, hydrophobic groups, solubilizing groups, blocking groups, and releasing or releasable groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

In a preferred embodiment of the invention, the amount of light-absorbing dye can be, for example, from about 0.01 g/m$_2$ to about 0.500 g/m$^2$. In another preferred embodiment, the dye layer also has associated therewith an image dye or pigment.

If a stabilizer is utilized, useful stabilizers are also those which have a solubility of no less than about 0.5 milligrams per milliliter in an organic solvent such as methanol. Examples of useful stabilizers include nickel dithiolene dyes such as those described in "Nickel Dithiolene Complexes", Nakazumi, H. et al, JSDC, Vol. 106, 363–367, 1990; dithiolene dyes such as those described in "The Synthesis of Dithiolene Dyes with Strong Near—IR. Absorption" Mueller-Westerhoff, U. T. et al, Tetrahedron Vol. 47, No. 6, 1991, 909–932; bisdithio-a-diketones such as those described in "Preparation, Reactions and Structure of Bisdithio-a-diketone Complexes of Nickel, Palladium and Platinum" Schtuazer, G. and Mayweg, V., J. Am. Chem. Soc., 87, 1965, 1483; dithiolato nickel complexes such as those described in "The influence of dithiolato nickel complexes on the light fastness of a thin layer of a nera infrared absorbing cyanine dye" Nakazumi, H. et al, JSDC, Vol. 105, 173–176, 1988; and bis-(thiobenzil) nickel compounds such as those described in "Bis-(thiobenzil) nickel compounds on their absorption spectra, reduction potential and singlet oxygen quenching efficiency" Shiozaki, H. et al, JSDC, Vol. 105, 26–29, 1989.

In forming the polymer particle composition used in the invention, the IR dye and, optionally the stabilizer, are associated with polymer particles. This can be accomplished by dissolving the dye and stabilizer in a water-miscible organic solvent, mixing the solution with the polymer particles, and then removing the solvent. Useful water-miscible organic solvents are water-miscible alcohols, ketones and amides, tetrahydrofuran, N-methyl-2-pyrrolidone, dimethylsulfoxide, and mixtures thereof. Particular examples of these solvents include acetone, ethylacetate, tetrahyrofuran, dichloromethane, chloroform, ethyl alcohol, methyl alcohol, isopropyl alcohol, dimethylformamide, methyl-ethyl ketone, and the like.

The aqueous latices that are the preferred coating compositions consist essentially of water as a continuous phase and loaded polymer particles as a dispersed phase. The loadable polymer particles are those which meet the following test: At 25° C., the loadable polymer particles being tested must (a) be capable of forming a latex with water at a polymer-particle concentration of from 0.2 to 50 percent by weight, preferably 1 to 20 percent by weight, based on total weight of the latex, and (b) exhibit no observable coagulation of the polymer particles when 100 ml of the latex is then mixed in an equal volume of the water-miscible organic solvent to be employed in forming the loaded polymeric latex composition, stirred, and allowed to stand for 10 minutes.

Aqueous latices can be prepared by free radical polymerization or by condensation polymerization. Emulsion polymerization is the preferred method of preparing polymer latices. Monomers suitable to prepare the polymer latices for this application include an acrylic acid, for example, acrylic acid, α-chloroacrylic acid, an α-alkylacrylic acid (such as methacrylic acid, etc.), etc., an ester or amide derived from an acrylic acid (for example, acrylamide, methacrylamide, n-butylacrylamide, t-butylacrylamide, diacetone acrylamide, methyl acrylate, ethyl acrylate, n-propyl acrylate, n-butyl acrylate, ter-butyl acrylate, isobutyl acrylate, 2-ethylhexyl acrylate, n-octyl acrylate, lauryl acrylate, tetrahydrofuryl acrylate, methyl methacrylate, ethyl methacrylate, n-butyl methacrylate, β-hydroxy methacrylate, tetrahydrofurylmethacrylate, etc.), a vinyl ester (for example, vinyl acetate, vinyl propionate, vinyl laurate, etc.), acrylonitrile, methacrylonitrile, an aromatic vinyl compound (for example, styrene and a derivative thereof, vinyl toluene, divinyl benzene, vinyl acetophenone, sulfostyrene, etc.), itaconic acid, citraconic acid, crotonic acid, vinylidene chloride, a vinyl alkyl ether (for example, vinyl ethyl ether, etc.), an ester of maleic acid, N-vinyl-2-pyrrolidone, N-vinylpyridine, 2- or 4-vinylpyridine, etc. Of these monomers, an ester of acrylic acid, an ester of methacrylic acid, and styrene and styrene derivatives are particularly preferred. Two or more ethylenic unsaturated monomers can be used together. For example, a combination of methyl acrylate and butyl acrylate, ethyl acrylate and styrene, tetrahydroftryl methacrylate and ethylacrylate, methyl acrylate and ethyl acrylate, etc. can be used.

The polymer latex can be prepared by emulsion polymerization of solution polymerization technique. Emulsion polymerization is preferred. Emulsion polymerization is well known in the art and is described, for example, in F. A. Bovey, Emulsion Polymerization, issued by Interscience Publishers, Inc. New York, 1955. Examples of the chemical initiators which may be used include a thermally decomposable initiator, for example, a persulfate (such as ammonium persulfate, potassium persulfate, sodium persulfate), hydrogen peroxide, 4,4'-azobis(4-cyanovaleric acid), and redox initiators such as hydrogen peroxide-iron(II) salt, potassium persulfate-sodium hydrogensulfate, potassium persulfate-sodium metabisulfite, potassium persulfate-sodium hydrogen bisulfite, cerium salt-alcohol, etc. Emulsifiers which may he used in the emulsion polymerization include soap, a sulfonate(for example, sodium N-methyl-N-oleoyltaurate, sodium dodecylbenzene sulfonate alpha-olefin sulfonate, diphenyloxide disulfonate, naphthalene sulfonate, sulfosuccinates and sulfosuccinamates, polyether sulfonate, alkyl polyether sulfonate, alkylarylpolyether sulfonate, etc.), a sulfate (for example, sodium dodecyl sulfate), a phosphate (for example, nonylphenol ethoxylate phosphate, linear alcohol alkoxylate phosphate, alkylphenol ethoxylate phosphate, phenol ethoxylate), a cationic compound (for example, cetyl trimethylammonium bromide, hexadecyl trimethylammonium bromide, etc.), an amphoteric compound and a high molecular weight protective colloid (for example, polyvinyl alcohol, polyacrylic acid, gelatin, etc.).

A second class of polymer latices is aqueous dispersion of polyester such as Eastman AQ® polyesters produced by the Eastman Chemicals Company. The three polyesters, Eastman AQ 29, AQ 38, and AQ 55 are composed of varying amounts of isophthalic acid, sodium sulfoisophthalic acid, diethylene glycol, and 1,4-cyclohexanedimethanol. These thermoplastic, amorphous, ionic polyesters are prepared by a melt-phase condensation polymerization at high temperature and low pressure, and the molten product is extruded into small pellets. The solid polymer disperses readily in water at 70° C. with minimal agitation to give translucent, low viscosity dispersions containing no added surfactants or solvents. Varying the amount of ionic monomers, i.e., sulfoisophthalic acid, can control the particle size. The particle sizes range from 20 to 100 nm. A third class of polymer latices is aqueous dispersion of polyurethane such as Witcobond® anionic and cationic polyurethane dispersion by Witco Corp. or Sancure® polyurethane by B.F. Goodrich Company. A review reference on the aqueous dispersible polyurethane can be found in "Progress in Organic Coatings, 9(3), 281–340 (1981), by Dieterich, D. The synthesis of water dispersible polyurethane involves: (1) condensation polymerization of diols, diisocyanate, and a functional diol such as carboxyldiol, or sulfodiol in a water miscible organic solvent such as acetone or tetrahydrofaran; (2) neutralization of the polyurethane with arnines or sodium hydroxide in water; and (3) chain extension with diamines and followed by removal of the low boiling organic solvent. Examples of diols include polytetrahydrofuryl diol, poly(tetramethylene adipate) glycol, poly(caprolactone) diol, poly(ethylenen glycol), etc. Examples of diisocyanate include hexamtethylene diisocyanate, 4,4'-bis(isocyanatocyclohexyl)methane, or other diisocyanates disclosed in column 6 of U.S. Pat. No. 4,147,679. Examples of the functional diols can be found in "Progress in Organic Coatings, 9(3), pp. 292 (1981), by Dieterich, D.

In a preferred preparation process, the desired squarine dye and optional stabilizer can be dissolved in an organic solvent and added dropwise to the polymer latex solution with vigorous stirring. Dye and stabilizer concentration in the organic solvent is preferably 0.1–5% by weight, more preferably 0.5–2% by weight. The latex solution preferably contains 1–20% polymer by weight, more preferably 2–10% by weight. Then the organic solvent can be removed by evaporation and the latex solution filtered through a 0.25 μm filter to obtain a dye loaded latex stock solution. The solution can be dialyzed to remove any remaining free dye molecules in water.

In the final composition, the weight ratio of dye to latex polymer is not critical. Typical dye to polymer weight ratios can be from 1:100 to 1:5, preferably 1:80 to 1:8, and still more preferably 1:40 to 1:8. If stabilizer is utilized, while it is desirable to have at least the same amount of stabilizer compared to the dye present, here again the ratio of dye to stabilizer is not critical. Typical dye to stabilizer weight ratios can be from 2:1 to 1:10 with the preferred dye to stabilizer weight ratio being between 1:1 to 1:5. In one embodiment it is preferred to have the dye in close proximity to the stabilizer on the latex particle. Thus, it is desirable to have a high amount of dye to latex polymer and a high amount of stabilizer to dye. In weight ratio terms, it is preferred to have a weight ratio of dye to polymer of 1:40 or less and, at the same time, a weight ratio of dye to stabilizer of 1:1 to 1:2.

The loaded latex composition may contain a colorant if a visible mark is desired. Pigments which may be used in the invention include those as disclosed, for example, in U.S.

Pat. Nos. 5,026,427; 5,086,698; 5,141,556; 5,160,370; and 5,169,436, the disclosures of which are hereby incorporated by reference. The exact choice of pigments will depend upon the specific application and performance requirements such as color reproduction and image stability. Pigments suitable for use in the present invention include, for example, azo pigments, monoazo pigments, diazo pigments, azo pigment lakes, β-Naphthol pigments, Naphthol AS pigments, benzimidazolone pigments, diazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 20 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C. I. Pigment Violet 1, 2, 3, 5:1, 13, 19, 23, 25, 27, 29, 31, 32, 37, 39, 42, 44, 50; C. I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C. I. Pigment Green 1, 2, 4, 7, 8, 10, 36, 45; C. I. Pigment Black 1, 7, 20, 31, 32, and C .I. Pigment Brown 1, 5, 22, 23, 25, 38, 41, 42.

A broad range of water-insoluble dyes may be used in the invention such as an oil dye, a disperse dye, or a solvent dye, such as Ciba-Geigy Orasol Red G, Ciba-Geigy Orasol Blue GN, Ciba-Geigy Orasol Pink, and Ciba-Geigy Orasol Yellow. Preferred water-insoluble dyes can be xanthene dyes, methine dyes, polymethine dyes, anthroquinone dyes, merocyanine dyes, azamethine dyes, azine dyes, quinophthalone dyes, thiazine dyes, oxazine dyes, phthalocyanine dyes, mono or poly azo dyes, and metal complex dyes. More preferably, the water insoluble dyes can be an azo dye such as a water insoluble analog of the pyrazoleazoindole dye disclosed in U.S. Pat. No. 6,468,338, incorporated herein by reference, and the arylazoisothiazole dye disclosed in U.S. Pat. No. 4,698,651, incorporated herein by reference; or a metal-complex dye, such as the water-insoluble analogues of the dyes described in U.S. Pat. Nos. 5,997,622 and 6,001,161, both incorporated herein by reference, i.e., a transition metal complex of an 8-heterocyclylazo-5-hydroxyquinoline.

A broad range of water-soluble dyes can be used in this invention. Examples of a water soluble dye include a reactive dye, direct dye, anionic dye, acid dye, basic dye, phthalocyanine dye, methine or polymethine dye, merocyanine dye, azamethine dye, azine dye, quinophthalone dye, thiazine dye, oxazine dye, anthraquinone, a metal-complex dye, or dyes as disclosed in U.S. Pat. No. 5,973,026, the disclosure of which is hereby incorporated by reference. In a preferred embodiment of the invention, the water-soluble dye may be an anionic dye. Anionic dyes which may be used include a mono or poly azo dye, such as a pyrazoleazoindole dye as disclosed in U.S. patent application Ser. No. 09/689, 184 filed Oct. 12, 2000; a metal-complex dye, such as the transition metal complexes as disclosed in U.S. Pat. Nos. 5,997,622 and 6,001,161, i.e., a transition metal complex of an 8-heterocyclylazo-5-hydroxyquinoline; phthalocyanine dyes such as C. I. Direct Blue 199; C. I. Direct Blue 307; Reactive Black 31, Reactive Red 31, anthraquinone dyes, or anthrapyridone dyes, as disclosed, for example, in U.S. Pat. No. 6,152,969; EP 1 063 268; EP 1 067 155; WO 00/23440; WO 01/18123; JP 2000-256587; and JP 2001-072884, the disclosures of which are hereby incorporated by reference.

A final printing ink composition which comprises a latex composition having water as a continuous phase and, as the dispersed phase, hydrophobic polymer particles having associated therewith the infrared squarine dye, can be prepared by proper dilution of the dye loaded latex stock solution with distilled water and appropriate surfactants, humectants, and other ink colorants or additives known in the art. The concentration of the dye material in the ink solution can be 0.005%~1% by weight, preferably 0.01%~5% by weight. As noted, various additives may be added to the inks of the invention. Suitable additives, which may be dependent on the type of printer utilized, include surfactants, surface active agents, defoaming agents, corrosion inhibitors, and biocides.

Preferred surface active agents or surfactants are the nonionic types containing polyalkylene oxide moieties. A particularly preferred type of nonionic surfactant is obtained by ethoxylating acetylenic diols, such as ethoxylated tetramethyl decynediol (Surfynol® 465, provided by Air Products and Chemicals, Inc., Allentown, Pa. 18195) that can be added at 0.5%–2% by weight, with the presence of 2–10% glycerol, 2–10% diethyleneglycol, 2–10% propanol, and 0%–2% triethanolamine. The activity of the surfactant may be controlled by addition of a defoaming agent or defoamer. A preferred defoamer is comprised of a mixture of tetramethyldecynediol and propylene glycol (Surfynol® 104 PG, provided by Air Products and Chemicals, Inc., Allentown, Pa. 18195). The term "biocide" is used to describe various antifungal compounds used to prevent or control the growth of various fungi upon prolonged standing of the ink compositions. A useful biocide is 1,2-benzisothiazolin-3-one (Proxel®GXL, ICI Americas, Inc., Wilmington, Del. 19897). Corrosion inhibitors are added to the ink formulations to inhibit or reduce corrosion of the metal parts, particularly the nozzles/orifices, of the inkjet printers. A preferred class of corrosion inhibitors are the 1H-benzotriazoles and 1H-benzotriazole itself is the preferred corrosion inhibitor (Cobratec® 99, PMC Specialties, Cincinnati, Ohio).

The printing ink composition is printed onto to the back side of the silver halide photographic display element using a Gravuere printer or other means known to those skilled in the art, such as an inkjet printer. By the "back side" of the display element is meant on the opposite side of the support from the silver halide imaging layers. By the "front side" of the display element is meant the side of the display element comprising the imaging layers. Generally the printing ink will be applied to the outermost surface of the back side of the display dement but it is possible that another layer, such as a protective layer, might be coated over the printing ink composition. After application, the composition is coalesced on the surface. Coalescence can be accomplished by simply drying the composition. Alternatively, some heat may be applied to facilitate coalescence.

The printing ink composition can be applied in a logo or pattern that represents digital data or which merely provides an infrared or optical signal. For media detection, a media such as photographic paper, that has a printed detectable logo pattern or indicia on the backside can pass under a photo sensor, or optionally, a photo sensor can pass over stationery media. An infrared (IR) source directs an IR beam onto the surface or backside of media while a photo sensor detects IR illumination reflected off the surface of the media. The presence of an IR absorbing logo, or a reflectivity difference in the media, changes the amount of reflected IR illumination and therefore changes the signal produced by the sensor. Within the context of the present invention, IR illumination is used so that no damage will occur to visible light sensitive photographic paper and so that invisible marking may be utilized.

The signal from the sensor is generally passed through conditioning electronics, such as amplifiers or filters, to improve the sensor signals and prepare it for conversion to digital form by an analog to digital converter or digitizer by way of a micro-controller or computer. The digital data is thereafter placed into a buffer for processing by a Digital Signal Processor (DSP) or other computer of appropriate processing capacity such as micro-controller or computer. System operation begins with a start signal from a host or a system computer to the micro-controller. Thereafter, a result signal from the micro-controller is passed to the system or host computer.

One method of utilizing such information relates to a method of detecting a type of media for use in an imaging apparatus which comprises the steps of directing a beam of infrared illumination onto a backside of media and detecting the presence of the indicia on the backside of the media based on the infrared illumination reflected from the backside of the media. Another method comprises directing a beam of infrared illumination onto the backside of media having repeating indicia thereon and detecting the infrared illumination reflected from the backside of the media to provide for a first signal; detecting a change in the reflected infrared illumination when the repeating indicia receives the beam of infrared illumination to provide for a second signal; calculating a repeat distance of the indicia based on the first and second signals, and comparing the calculated repeat distance to stored indicia repeat distances for reference media to determine the type of media, as described in more detail in U.S. application Ser. No. 10/144,487 filed May 13, 2002.

Commercial inkjet printers such as HP Deskjet 560 or Epson Stylus Color 200 can used for testing, with a printing resolution of 300 or 360 dpi. For infrared markings, either logos, trademark symbols, step-wedge files, or bar code can be printed digitally onto various supports at the visual reflection density of 0.01–1.0, preferably 0.05–0.4. Commercial rubber stamps can be used to apply the ink to a surface for evaluation purposes. Alternatively the inks may be sprayed using an airbrush. One airbrush used in this invention was purchased from Badger Air-Brush Co., 9128 W. Belmont. Ave., Franklin Park, IL 60131 (Model 200).

The silver halide emulsions utilized in this invention may be comprised of, for example, silver chloride, silver bromide, silver bromoiodide, silver bromochloride, silver iodochloride, silver bromoiodochloride, and silver iodobromochloride enulsions. The silver halide emulsions are preferably predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

It is contemplated that the predominantly silver chloride emulsions may take the form of a variety of morphologies including those with cubic, tabular, and tetradecahedral grains with {111} and {100} crystal faces. The grains may take the form of any of the naturally occurring morphologies of cubic lattice type silver halide grains. Further, the grains may be irregular such as spherical grains. Additionally, these emulsions may contain iodides or bromides of less than 10% of the total halide composition.

The grains can be contained in any conventional dispersing medium capable of being used in photographic emulsions. Specifically, it is contemplated that the dispersing medium be an aqueous gelatino-peptizer dispersing medium, of which gelatin—e.g., alkali treated gelatin (cattle bone and hide gelatin) or acid treated gelatin (pigskin gelatin) and gelatin derivatives—e.g., acetylated gelatin, phthalated gelatin, and the like are specifically contemplated. When used, gelatin is preferably at levels of 0.01 to 100 grams per total silver mole The photographic display elements of the invention can be black-and-white elements, including chromogenic black-and-white elements, single color elements, or multicolor elements. The supports utilized in this invention are generally reflective supports such as are known in the art. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. In one suitable embodiment the pyrimidine compounds utilized in the invention are added to the yellow dye image-forming unit either in the silver halide emulsion or in the coupler dispersion.

If desired, the photographic element can be used in conjunction with an applied magnetic layer as described in *Research Disclosure*, November 1992, Item 34390 published by Kenneth Mason Publications, Ltd., Dudley Annex, 12a North Street, Emsworth, Hampshire PO01 7DQ, ENGLAND, the contents of which are incorporated herein by reference In the following Table, reference will be made to (1) *Research Disclosure*, December 1978, Item 17643, (2) *Research Disclosure*, December 1989, Item 308119, (3) *Research Disclosure* September 1994, Item 36544, and (4) *Research Disclosure*, September 1996, Item 38957, all published by Kenneth Mason Publications, Ltd., Dudley Annex, 12a North Street, Emsworth, Hampshire PO10 7DQ, ENGLAND, the disclosures of which are incorporated herein by reference. The. Table and the references cited in the Table are to be read as describing particular components suitable for use in the elements of the invention. The Table and its cited references also describe suitable ways of preparing, exposing, processing and manipulating the elements, and the images contained therein. High chloride photographic elements and methods of processing such elements particularly suitable for use with this invention are described in *Research Disclosure*, February 1995, Item 37038, in *Research Disclosure*, September 1997, Item 40145 and, of particular interest, *Research Disclosure*, September 2000, Item 437013 published by Kenneth Mason Publications, Ltd., Dudley Annex, 12a North Street, Emsworth, Hampshire PO10 7DQ, ENGLAND, the disclosures of which are incorporated herein by reference.

| Reference | Section | Subject Matter |
|---|---|---|
| 1 | I, II | Grain composition, morphology and preparation. |
| 2 | I, II, IX, X, XI, XII, XIV, XV | |
| 3 & 4 | I, II, III, IX A & B | Emulsion preparation including hardeners, coating aids, addenda, etc. |
| 1 | III, IV | Chemical sensitization and spectral sensitization/Desensitization |
| 2 | III, IV | |
| 3 & 4 | IV, V | |
| 1 | V | UV dyes, optical brighteners, luminescent dyes |
| 2 | V | |
| 3 & 4 | VI | |
| 1 | VI | Antifoggants and stabilizers |
| 2 | VI | |
| 3 & 4 | VII | |
| 1 | VIII | Absorbing and scattering materials; Antistatic layers; matting agents |
| 2 | VIII, XIII, XVI | |
| 3 & 4 | VIII, IX C & D | |
| 1 | VII | Image-couplers and image-modifying couplers; Wash-out couplers; Dye stabilizers and hue modifiers |
| 2 | VII | |
| 3 & 4 | X | |
| 1 | XVII | Supports |
| 2 | XVII | |
| 3 & 4 | XV | |
| 3 & 4 | XI | Specific layer arrangements |
| 3 & 4 | XII, XIII | Negative working emulsions; Direct positive emulsions |
| 2 | XVIII | Exposure |
| 3 & 4 | XVI | |
| 1 | XIX, XX | Chemical processing; Developing agents |
| 2 | XIX, XX, XXII | |
| 3 & 4 | XVIII, XIX, XX | |
| 3 & 4 | XIV | Scanning and digital processing procedures |

The photographic elements may utilize any traditional support known to those skilled in the art. One conventional photographic quality paper comprises cellulose paper with polyethylene resin waterproof coatings. The support may also consist of a multilayer film of biaxially oriented polyolefin which is attached to both the top and bottom of a photographic quality paper support by melt extrusion of a polymer tie layer. The biaxially oriented films may contain a plurality of layers in which at least one of the layers contains voids. The voids provide added opacity to the imaging element. This voided layer can also be used in conjunction with a layer that contains at least one pigment from the group consisting of $TiO_2$, $CaCO_3$, clay, $BaSO_4$, ZnS, $MgCO_3$, talc, kaolin, or other materials that provide a highly reflective white layer in said film of more than one layer. The combination of a pigmented layer with a voided layer provides advantages in the optical performance of the final image. These supports are described in more detail in U.S. Pat. Nos. 5,866,282; 5,888,681; 6,030,742; 6,030,759; 6,107,014; and 6,153,351. Such biaxially oriented films may also be utilized for display materials having translucent or transparent supports.

The photographic elements comprising the radiation sensitive high chloride emulsion layers can be conventionally optically printed, or can be image-wise exposed in a pixel-by-pixel mode using suitable high energy radiation sources typically employed in electronic printing methods. Suitable actinic forms of energy encompass the ultraviolet, visible and infrared regions of the electromagnetic spectrum as well as electron-beam radiation and is conveniently supplied by beams from one or more light emitting diodes or lasers, including gaseous or solid state lasers. Exposures can be monochromatic, orthochromatic or panchromatic. For example, when the recording element is a multilayer multicolor element, exposure can be provided by laser or light emitting diode beams of appropriate spectral radiation, for example, infrared, red, green or blue wavelengths, to which such element is sensitive. Multicolor elements can be employed which produce cyan, magenta and yellow dyes as a function of exposure in separate portions of the electromagnetic spectrum, including at least two portions of the infrared region, as disclosed in the previously mentioned U.S. Pat. No. 4,619,892. Suitable exposures include those up to 2000 nm, preferably up to 1500 nm. Suitable light emitting diodes and commercially available laser sources are known and commercially available. Imagewise exposures at ambient, elevated or reduced temperatures and/or pressures can be employed within the useful response range of the recording element determined by conventional sensitometric techniques, as illustrated by. T. H. James, *The Theory of the Photographic Process*, 4th Ed., Macmillan, 1977, Chapters 4, 6, 17, 18, and 23.

The quantity or level of high energy actinic radiation provided to the recording medium by the exposure source is generally at least $10^{-4}$ ergs/cm$^2$, typically in the range of about $10^{-4}$ ergs/cm$^2$ to $10^{-3}$ ergs/cm$^2$, and often from $10^{-3}$ ergs/cm$^2$ to $10^{-2}$ ergs/cm$^2$. Exposure of the recording element in a pixel-by-pixel mode as known in the prior art persists for only a very short duration or time. Typical maximum exposure times are up to $100\mu$ seconds, often up to $10\mu$ seconds, and frequently up to only $0.5\mu$ seconds. Single or multiple exposures of each pixel are contemplated. The pixel density is subject to wide variation, as is obvious to those skilled in the art. The higher the pixel density, the sharper the images can be, but at the expense of equipment complexity. In general, pixel densities used in conventional electronic printing methods of the type described herein do not exceed $10^7$ pixels/cm$^2$ and are typically in the range of about $10^4$ to $10_6$ pixels/cm$^2$. An assessment of the technology of high-quality, continuous-tone, color electronic printing using silver halide photographic paper which discusses various features and components of the system, including exposure source, exposure time, exposure level and pixel density and other recording element characteristics is provided in Firth et al, *A Continuous-Tone Laser Color Printer*, Journal of Imaging Technology, Vol. 14, No. 3, June 1988, which is hereby incorporated herein by reference. A description of some of the details of conventional electronic printing methods comprising scanning a recording element with high energy beams such as light emitting diodes or laser beams, are set forth in Hioki U.S. Pat. No. 5,126,235, European Patent Applications 479 167 A1 and 502 508 A1.

The photographic elements can then be processed to form a visible dye image. Processing to form a visible dye image includes the step of contacting the element with a color developing agent to reduce developable silver halide and oxidize the color developing agent. Oxidized color developing agent in turn reacts with the coupler to yield a dye. With negative-working silver halide, the processing step described above provides a negative image. In one embodiment the described elements can be processed in the known color print processes such as the RA-4 process of Eastman Kodak Company, Rochester, New York.

The following examples illustrate the practice of this invention. They are not intended to be exhaustive of all possible variations of the invention. Parts and percentages are by weight unless otherwise indicated.

EXAMPLES

Example 1

Synthesis of Dye

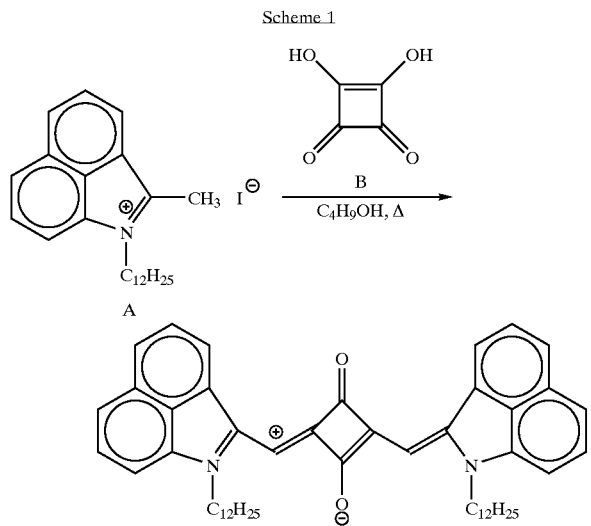

SCHEME 1

Dyes were generally synthesized according to Scheme 1 shown above. For example, 2-Methyl-3-N-dodecyl-benz(c,d)olium iodide A (20.8 g, 0.05 mole) was heated with commercially available (from Aldrich Chemical Co., 1000 W. St. Paul St., Milwaukee, Wis., 53233) squaric acid (2.8 g, 0.025) in butanol (250 mL). When 100 mL of butanol was evaporated, the solution was allowed to cool to room temperature. Ether (500 mL) was added, and the black solid was collected by filtration. The solid was recrystallized from acetic acid (250 mL). After drying in a vacuum oven, 16 g of the dye (85% of theoretical) was obtained. All the dyes in the table were formed in a similar fashion except the appropriate nucleus A was used. All wavelength maximums and extinction coefficients were measured in $CH_3OH$.

| Dyes | Absorbance maximum | Extinction maximum |
|---|---|---|
|  | 810 nm | $16.3 \times 10^4$ |
|  | 820 nm | $18.2 \times 10^4$ |

-continued
| Dyes | Absorbance maximum | Extinction maximum |
|---|---|---|
| 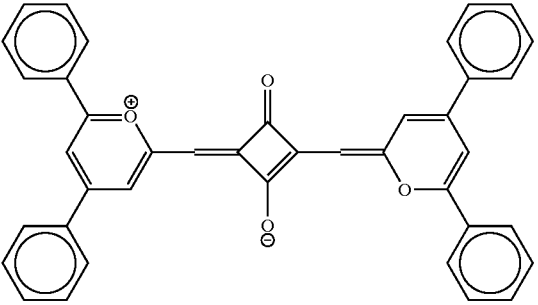 | 858 nm | $4.6 \times 10^4$ |
| 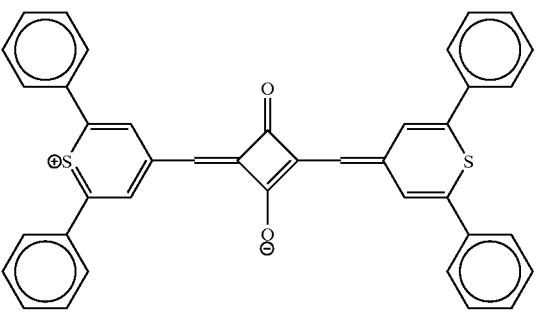 | 885 nm | $25.7 \times 10^4$ |
| 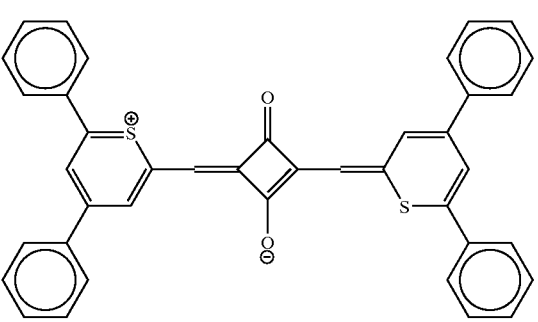 | 960 nm | $6.4 \times 10^4$ |
| 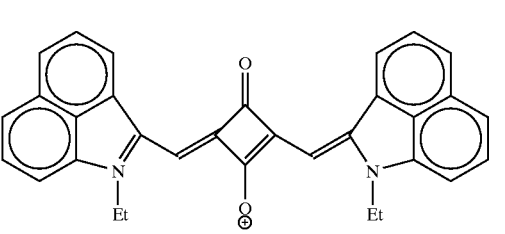 | 890 nm | $16.1 \times 10^4$ |
| 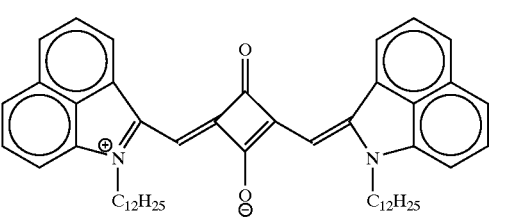 | 890 nm | $16.5 \times 10^4$ |

Example 2
Structures of dyes, and polymers used in the Examples.
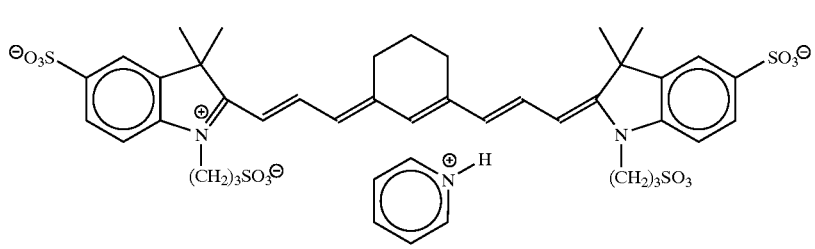
COMPARATIVE DYE
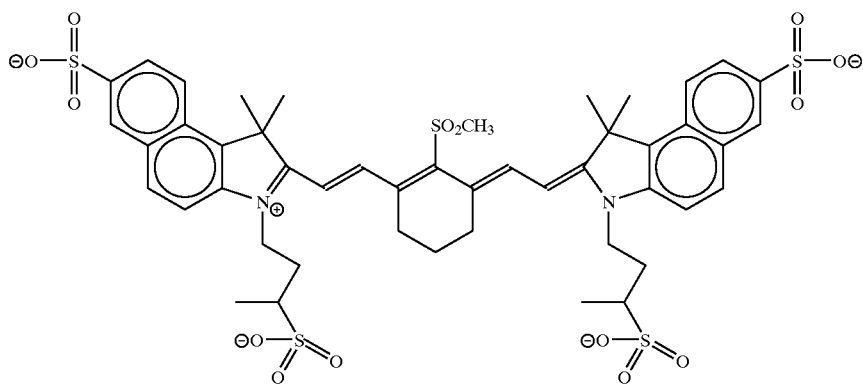
COMPARATIVE DYE B
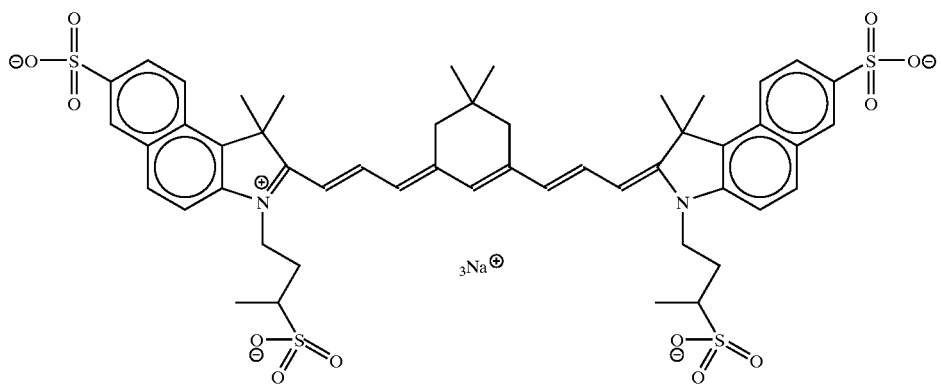
COMPARATIVE DYE C
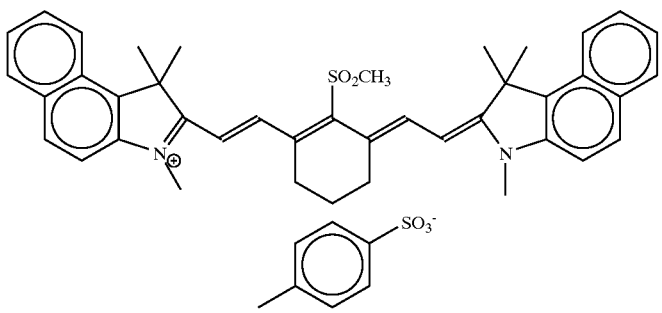
Polymer latex structures

P-1

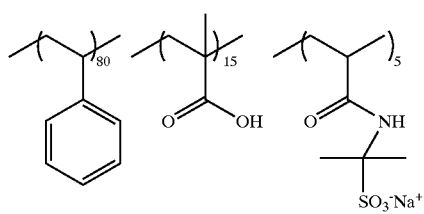

SEWna
EmEWna

P-2

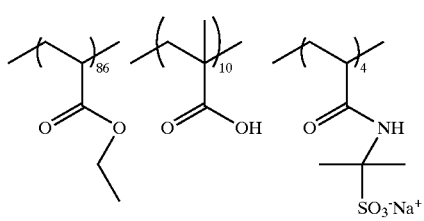

P-3

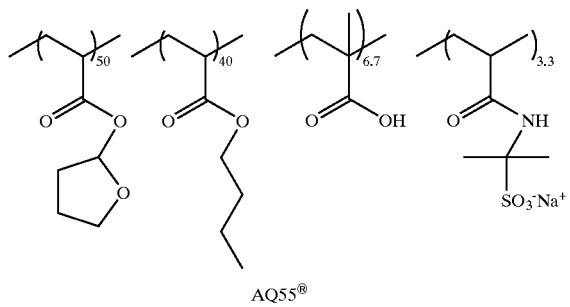

AQ55®

INVENTIVE DYE 4

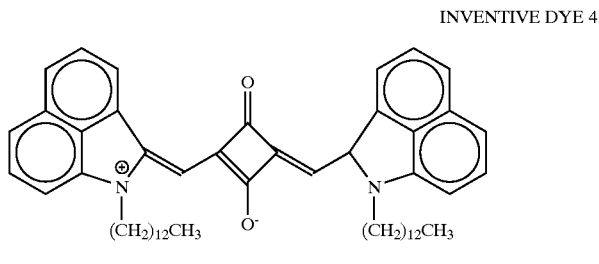

INVENTIVE DYE 6

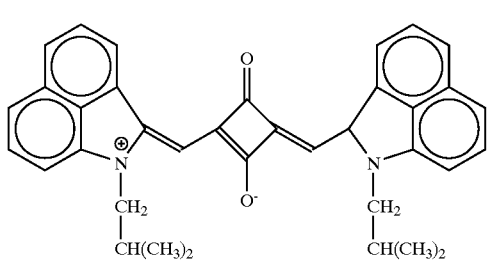

Element 1

Improved Light Stability of Latex-loaded IR Dyes Versus Water Soluble Dyes

Example 1

Comparative Example A "C-A"

To prepare comparative printing ink, 3.75 mg of the water soluble dye (C-A), 0.15 g Surfynol® 465 (from Air Products), 0.75 g glycerol, 0.6 g diethyleneglycol, 0.75 g propanol were added to 5.4 g distilled water. The final ink contained 0.025% wt dye, and 1% wt Surfynol 465, 5% wt glycerol, 4% wt diethyleneglycol and 5% wt propanol. The solution was filtered through a 0.45 μm filter and filled into a refillable inkjet cartridge. A step wedge image was printed on a Kodak medium weight photographic quality inkjet paper with an Epson 200 inkjet printer at 360 dpi resolution or a Hewlett-Packard Deskjet 560 printer at 360 dpi resolution. The sample was then irradiated at 5.4 Klux daylight for a week; the light stability was calculated based on the percent density loss of the sample at $\lambda_{max}$ at the highest density step. The results are shown in Table 1.

Comparative Example 2

An ink was prepared similar to Comparative Example 1 except that dye (A) was replaced with dye (B).

Comparative Example 3

To 8.6 g of the stock solution of polymer latex (P-3) (29% wt) stock solution was added 16.4 g of water and 25.0 g of methanol. The resulting composition was stirred vigorously at room temperature to form the latex solution. To prepare a dye solution, 12.5 mg of dye (C) was dissolved in a mixture of 2.5 ml of methanol and 2.5 ml of methylene chloride. The dye solution was then added dropwise to the latex solution with continuous stirring. After 1 hour, the organic solvent was removed under reduced pressure. The resulting dye (C) loaded latex stock solution was filtered through a 0.45 μm filter. The concentration of dye (C) in the latex stock solution was estimated to be 500 ppm, and the polymer concentration was ~10% by weight

Inventive Example 1

A dye loaded latex stock solution similar to Comparative Example 3 was prepared except that dye (C) was replaced with dye (4) and was loaded onto polymer latex (P-3).

Inventive Example 2

A dye loaded latex stock solution similar to Inventive Example 1 was prepared except that dye (4) was replaced with dye (6).

In general, the prepared inkjet ink solution was filled into a refillable inkjet cartridge. To prepare the ink containing dye loaded latex, 15 g Surfynol® 465 (from Air Product), 0.75 g glycerol, 0.6 g diethyleneglycol, 0.75 g propanol was added to a calculated amount of the dye loaded stock solution prepared above. A makeup amount of distilled water was added so that the final ink contains 0.025% wt dye, and 1% wt Surfynol® 465, 5% wt glycerol, 4% wt diethyleneglycol, and 5% wt propanol. The total amount of final ink solution was 15.0 g. The solution was filtered through a 0.45 μm filter and filled into a refillable cartridge.

A step wedge image was printed on a Kodak medium weight photographic quality inkjet paper with an Epson 200 inkjet printer at 360 dpi resolution. The sample was then irradiated under 5.4 Klux daylight for a week; the light stability was calculated based on the percent density loss of the sample at for the highest density step. The results are shown in Table 1.

The above elements were placed into a light exposure apparatus for 1 week at 5.4 klux and at 50 klux. The spectral absorbance curves before and after the exposure were measured in a spectrophotometer, and the stability was calculated based on the percentage density loss of the element at λmax for the highest density step. The following results were obtained:

TABLE 1

| IR Dye Sample | λmax (nm) | 5.4 Klux % IR Dye Density Loss | 50 Klux % IR Dye Density Loss |
|---|---|---|---|
| C-1 | 880 | 63.3 | 100* |
| C-2 | 940 | 100 | 100 |
| C-3 | 890 | 35 | 100 |
| 4 | 885 | 5 | 40 |
| 6 | 885 | 5 | 40 |

The above results show that the inventive squarine dyes 4 and 6 employed in this invention exhibit significantly less photodecomposition under both light conditions, as compared with prior art control compounds C-1, C-2, and C-3. The difference between Control Sample 3 and the inventive samples illustrate that the difference is not merely or entirely due to loading the dye onto latex.

The invention has been described in detail with particular reference to certain preferred embodiments thereof, but it will be understood that variations and modifications can be effected within the spirit and scope of the invention.

What is claimed is:

1. A silver halide photographic display element comprising a support, a front side which has at least one silver halide emulsion layer, and a back side, said front and back sides being on opposite sides of the support; wherein said photographic element further comprises printed on the back side a printing ink composition comprising coalesced hydrophobic polymer particles having associated therewith a squarine infrared absorbing dye represented by formula (II):

(II)

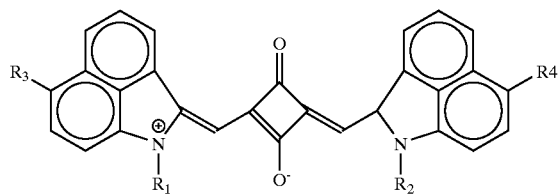

wherein $R_1$, $R_2$, $R_3$, and $R_4$ are independently a hydrogen or a halide atom, an alkylammonium (e.g., $N(CH_3)_2$, hydroxy or alkoxy group; an alkyl group having 1 to 20 carbon atoms a cycloalkyl group having 5 to 10 carbon atoms in the carbocyclic ring, an aryl group having 6 to 10 carbon atoms in the carbocyclic ring, or a heterocyclic group having 3 to 7 atoms in the ring and wherein $R_3$ and $R_4$ may be independently joined with the benzo groups to form a 5- to 7-membered ring or heterocyclic ring group.

2. The silver halide photographic display element of claim 1 wherein the squarine dye is

| Dye | $R_1$ | $R_2$ | $R_3$ | $R_4$ |
|---|---|---|---|---|
| 1 | Me | Me | H | H |
| 2 | Me | Me | Br | Br |
| 3 | Me | Phenyl | N(CH3)2 | Cl |
| 4 | $C_{12}H_{25}$ | $C_{12}H_{25}$ | H | H |
| 5 | $C_{12}H_{25}$ | $C_{12}H_{25}$ | Br | Br |
| 6 | $CH_2CH(CH_3)_2$ | $CH_2CH(CH_3)_2$ | H | H |
| 7 | $CH_2CH(CH_3)_2$ | $C_{12}H_{25}$ | $N(Ph)_2$ | $N(Ph)_2$ |
|  |  | or |  |  |
| 8 | $C_2H_4OH$ | $C_2H_4OH$ | H | H |

3. The silver halide photographic display element of claim 1 wherein the printing ink composition further comprises a colorant.

4. The silver halide photographic display element of claim 1 wherein the printing ink composition forms a pattern or logo.

5. The silver halide photographic display element of claim 4 wherein the printing ink composition forms a pattern or logo capable of being detected by a sensor.

6. The silver halide photographic display element of claim 1 wherein the printing ink composition further comprises a stabilizer.

7. A process for producing a display element having printed on the back side a printing ink composition comprising coalesced hydrophobic polymer particles having associated therewith a squarine infrared absorbing dye represented by formula II, comprising the steps of:

(1) printing a latex composition having water as a continuous phase and, as the dispersed phase, hydrophobic polymer particles having associated therewith the squarine infrared dye, in a digital pattern to said surface of said display element, and (2) coalescing said latex;

(II)

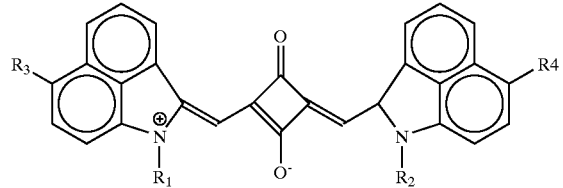

wherein $R_1$, $R_2$, $R_3$, and $R_4$ are independently a hydrogen or a halide atom, an alkylammonium (e.g., $N(CH_3)_2$, hydroxy or alkoxy group; an alkyl group having 1 to 20 carbon atoms, a cycloalkyl group having 5 to 10 carbon atoms in the carbocyclic ring an aryl group having 6 to 10 carbon atoms in the carbocyclic ring, or a heterocyclic group having 3 to 7 atoms and wherein $R_3$ and $R_4$ may be independently joined with the benzo groups to form a 5- to 7-membered ring or heterocyclic ring group.

* * * * *